US012150234B2

(12) United States Patent
Weng et al.

(10) Patent No.: US 12,150,234 B2
(45) Date of Patent: Nov. 19, 2024

(54) FLUID INTRODUCTION MODULE FOR PLASMA SYSTEM

(71) Applicant: Industrial Technology Research Institute, Hsinchu (TW)

(72) Inventors: Chih-Chiang Weng, Taoyuan (TW); Yo-Sung Lee, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 469 days.

(21) Appl. No.: 17/525,977

(22) Filed: Nov. 15, 2021

(65) Prior Publication Data

US 2023/0112886 A1 Apr. 13, 2023

(30) Foreign Application Priority Data

Oct. 12, 2021 (TW) ................................ 110137835

(51) Int. Cl.
*H05H 1/24* (2006.01)
*B05B 3/00* (2006.01)

(52) U.S. Cl.
CPC ................. *H05H 1/24* (2013.01); *B05B 3/00* (2013.01)

(58) Field of Classification Search
USPC .......................... 118/321, 323, 723 E, 723 R
See application file for complete search history.

(56) References Cited

U.S. PATENT DOCUMENTS 6,262,386 B1 7/2001 Fornsel
6,800,336 B1 * 10/2004 Fornsel .................... C23C 8/36 427/563
10,991,548 B2 4/2021 Gandhiraman et al.
2012/0261391 A1 10/2012 Ihde et al.
2020/0331012 A1 10/2020 Schramm et al.

FOREIGN PATENT DOCUMENTS

CN 105025647 11/2015
CN 110846640 2/2020
CN 112313005 2/2021
(Continued)

OTHER PUBLICATIONS

English Translation DE102015121253 A1 (Year: 2017).*
(Continued)

*Primary Examiner* — Yewebdar T Tadesse
(74) *Attorney, Agent, or Firm* — JCIPRNET

(57) ABSTRACT

A fluid introduction module for plasma system is adapted for being disposed in a plasma system and includes a rotating nozzle and a precursor supply device. The rotating nozzle includes a main flow channel, a plasma outlet located at an end of the main flow channel, a mixing flow channel that penetrates a side wall of the rotating nozzle and communicates with the main flow channel, an independent flow channel separated from the main flow channel, and a precursor independent outlet located at an end of the independent flow channel. The precursor supply device includes a fixed housing and a rotating bearing. The fixed housing is sleeved outside the rotating nozzle and includes a precursor inlet selectively communicating with either the mixing flow channel or the independent flow channel. The rotating bearing is disposed between the rotating nozzle and the fixed housing.

13 Claims, 6 Drawing Sheets

(56) References Cited

FOREIGN PATENT DOCUMENTS

| | | | |
|---|---|---|---|
| DE | 102015121253 | A1 * | 6/2017 |
| TW | 201117677 | | 5/2011 |
| TW | I380743 | | 12/2012 |
| TW | I531280 | | 4/2016 |
| TW | I666339 | | 7/2019 |
| TW | I719516 | | 2/2021 |
| WO | 2009156390 | | 12/2009 |
| WO | 2013144065 | | 10/2013 |

OTHER PUBLICATIONS

Christoph Regula et al., "Corrosion protection of copper surfaces by an atmospheric pressure plasma jet treatment," Surface and Coatings Technology, vol. 205, Supplement 2, Jul. 25, 2011, pp. S355-S358.

Jerome Pulpytel et al., "Deposition of Organosilicon Coatings by a Non-Equilibrium Atmospheric Pressure Plasma Jet: Design, Analysis and Macroscopic Scaling Law of the Process," Plasma Processes and Polymers, vol. 8, Issue7, Jul. 22, 2011, pp. 664-675.

Olivier Carton et al., "Plasma Polymerization of Acrylic Acid by Atmospheric Pressure Nitrogen Plasma Jet for Biomedical Applications," Plasma Processes and Polymers, vol. 9, Issue10, Oct. 2012, pp. 984-993.

Penghao Zhang et al., "Atmospheric-pressure plasma jet deposition of bumpy coating improves polypropylene surface flashover performance in vacuum," Surface and Coatings Technology, vol. 387, Apr. 15, 2020, 125511, pp. 1-11.

Ghiath Jnido et al., "Deposition of TiO2 Thin Films on Wood Substrate by an Air Atmospheric Pressure Plasma Jet," Coatings, vol. 9, No. 7, Jul. 2019, pp. 1-13.

Md.Mokter Hossain et al., "Improvement of mechanical strength of hydrophobic coating on glass surfaces by an atmospheric pressure plasma jet," Surface and Coatings Technology, vol. 357, Jan. 15, 2019, pp. 12-22.

"Office Action of Taiwan Counterpart Application", issued on Feb. 2, 2024, p. 1-p. 4.

* cited by examiner

FLUID INTRODUCTION MODULE FOR PLASMA SYSTEM

CROSS-REFERENCE TO RELATED APPLICATION

This application claims the priority benefit of Taiwan patent application no. 110137835, filed on Oct. 12, 2021. The entirety of the above-mentioned patent application is hereby incorporated by reference herein and made a part of this specification.

BACKGROUND

Technical Field

The disclosure relates to a fluid introduction module, and particularly, relates to a fluid introduction module for plasma system.

Description of Related Art

When atmospheric plasma is used to make a special surface functional group or a coating, in addition to maintaining a gas source required by the plasma, it is necessary to add a precursor fluid that may form the coating. If a plasma outlet nozzle is fixed, the precursor fluid may be introduced into the plasma outlet nozzle through a fixed pipeline connected to the plasma outlet nozzle. However, regarding a rotatable plasma outlet nozzle, how to set the fixed pipeline on the rotatable plasma outlet nozzle and how to prevent the pipeline from rotating when the plasma outlet nozzle rotates is a research direction of this field. In addition, different plasma and precursor fluids need to be mixed to different degrees, and how to meet different mixing needs is also a research direction of this field.

SUMMARY

The disclosure is directed to a fluid introduction module for plasma system applied to a plasma system and including a rotating nozzle and a precursor supply device arranged on the rotating nozzle without being linked to the rotating nozzle. In addition, the fluid introduction module for plasma system is designed to meet different mixing needs of plasma and precursor fluid.

The disclosure provides a fluid introduction module for plasma system adapted for being disposed in a plasma system and including a rotating nozzle and a precursor supply device. The rotating nozzle includes a main flow channel adapted to communicate with the plasma system, a plasma outlet located at an end of the main flow channel, a mixing flow channel that penetrates through a side wall of the rotating nozzle and communicates with the main flow channel, an independent flow channel separated from the main flow channel, and a precursor independent outlet located at an end of the independent flow channel. The precursor supply device includes a fixed housing and a rotating bearing. The fixed housing is sleeved outside the rotating nozzle and includes a precursor inlet. The precursor inlet selectively communicates with either the mixing flow channel or the independent flow channel. The rotating bearing is disposed between the rotating nozzle and the fixed housing. When the precursor inlet is adjusted to communicate with the mixing flow channel, a precursor fluid is adapted to flow from the precursor inlet to the main flow channel through the mixing flow channel, mix with plasma flowing into the main flow channel, and flow out from the plasma outlet together with the plasma. When the precursor inlet is adjusted to communicate with the independent flow channel, the precursor fluid is adapted to flow from the precursor inlet to the independent flow channel, and flow out from the precursor independent outlet, and then mix with the plasma flowing out from the plasma outlet.

Based on the above, in the fluid introduction module for plasma system provided by the disclosure, the main flow channel of the rotating nozzle is adapted to communicate with the plasma system. The mixing flow channel of the rotating nozzle penetrates through the side wall of the rotating nozzle and communicates with the main flow channel, and the independent flow channel of the rotating nozzle is separated from the main flow channel. The fixed housing of the precursor supply device is sleeved outside the rotating nozzle through the rotating bearing, such that the fixed housing does not rotate along with the rotating nozzle. In addition, the precursor inlet of the fixed housing selectively communicates with either the mixing flow channel or the independent flow channel. Therefore, when the precursor inlet is adjusted to communicate with the mixing flow channel, the precursor fluid is adapted to flow from the precursor inlet to the main flow channel through the mixing flow channel, mix with the plasma flowing into the main flow channel, and flow out from the plasma outlet together with the plasma. Alternatively, when the precursor inlet is adjusted to communicate with the independent flow channel, the precursor fluid is adapted to flow from the precursor inlet to the independent flow channel, and flows out from the precursor independent outlet and then mixes with the plasma flowing out from the plasma outlet. Therefore, the fluid introduction module for plasma system provided by the disclosure may meet the different mixing needs of the plasma and the precursor fluid.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
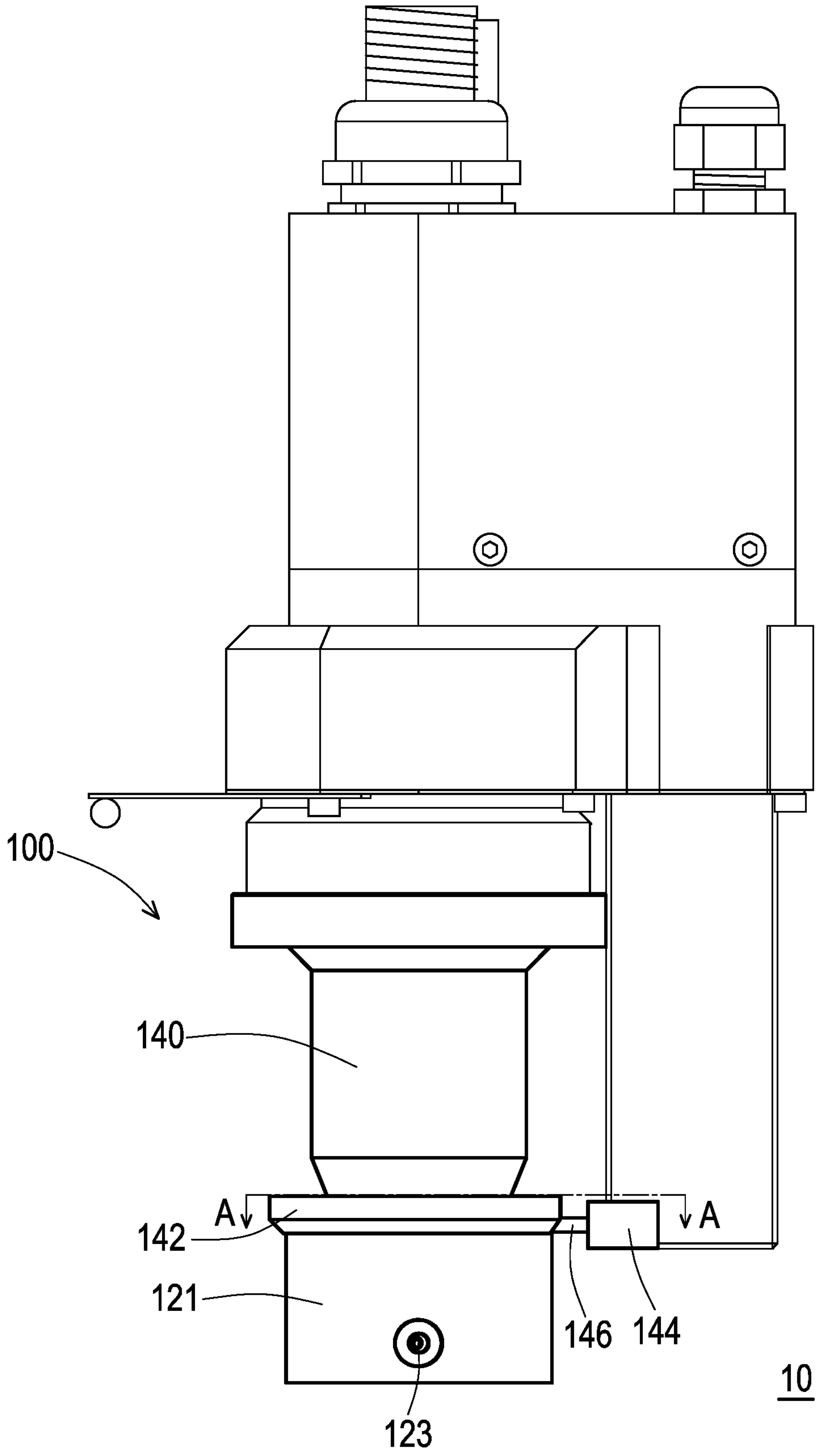
FIG. 1 is a schematic view of a fluid introduction module for plasma system arranged in a plasma system according to an embodiment of the disclosure.

FIG. 1 is a schematic view of a fluid introduction module for plasma system arranged in a plasma system according to an embodiment of the disclosure. Referring to FIG. 1, a fluid introduction module 100 (thick lines in FIG. 1) for plasma system of the embodiment is suitable for being installed in a plasma system 10, but it may also be installed in other systems with different mixing needs. The fluid introduction module for plasma system 100 is described in detail below.

Figure 2A:
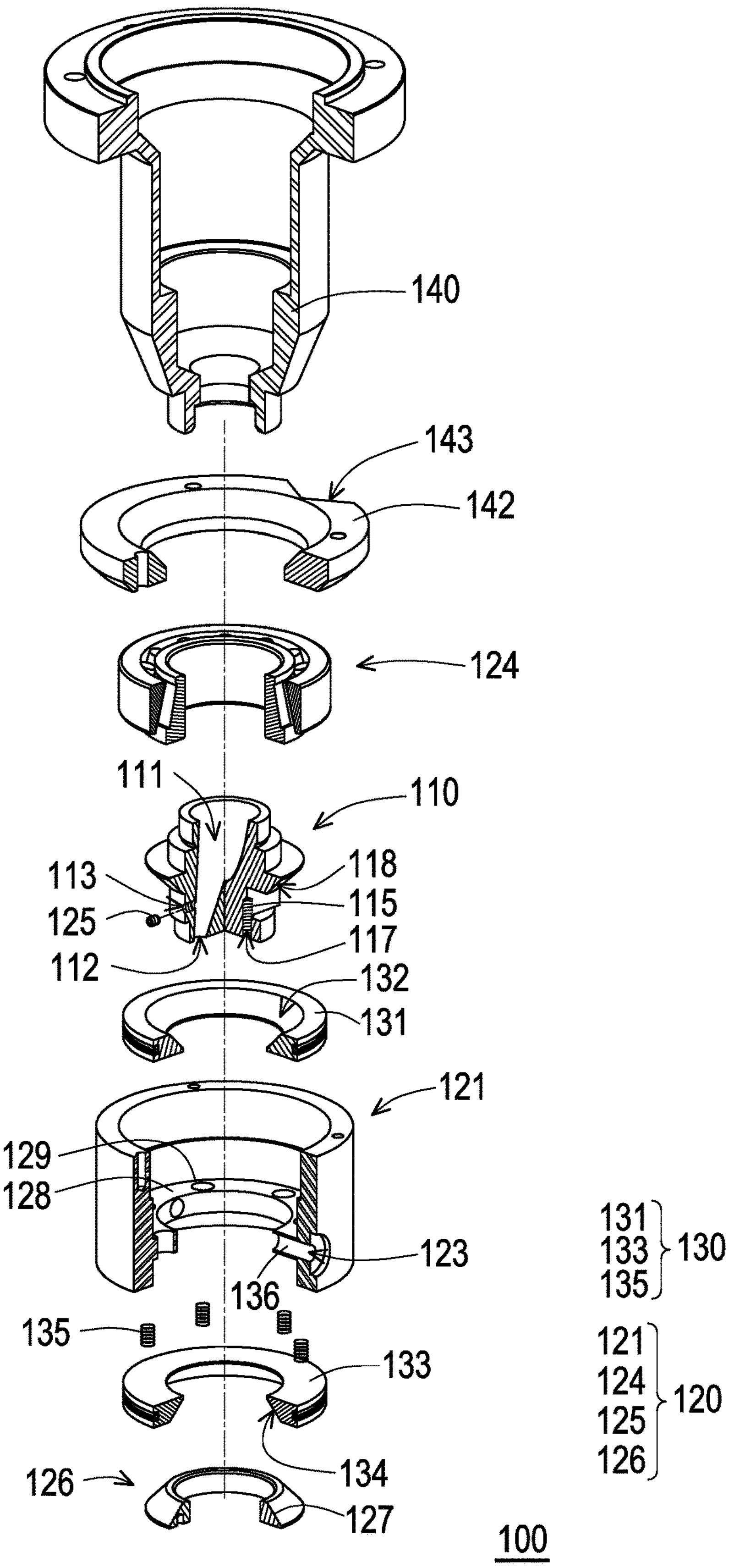
FIG. 2A is a cross-sectional exploded schematic view of the fluid introduction module for plasma system of FIG. 1.
Figure 2B:
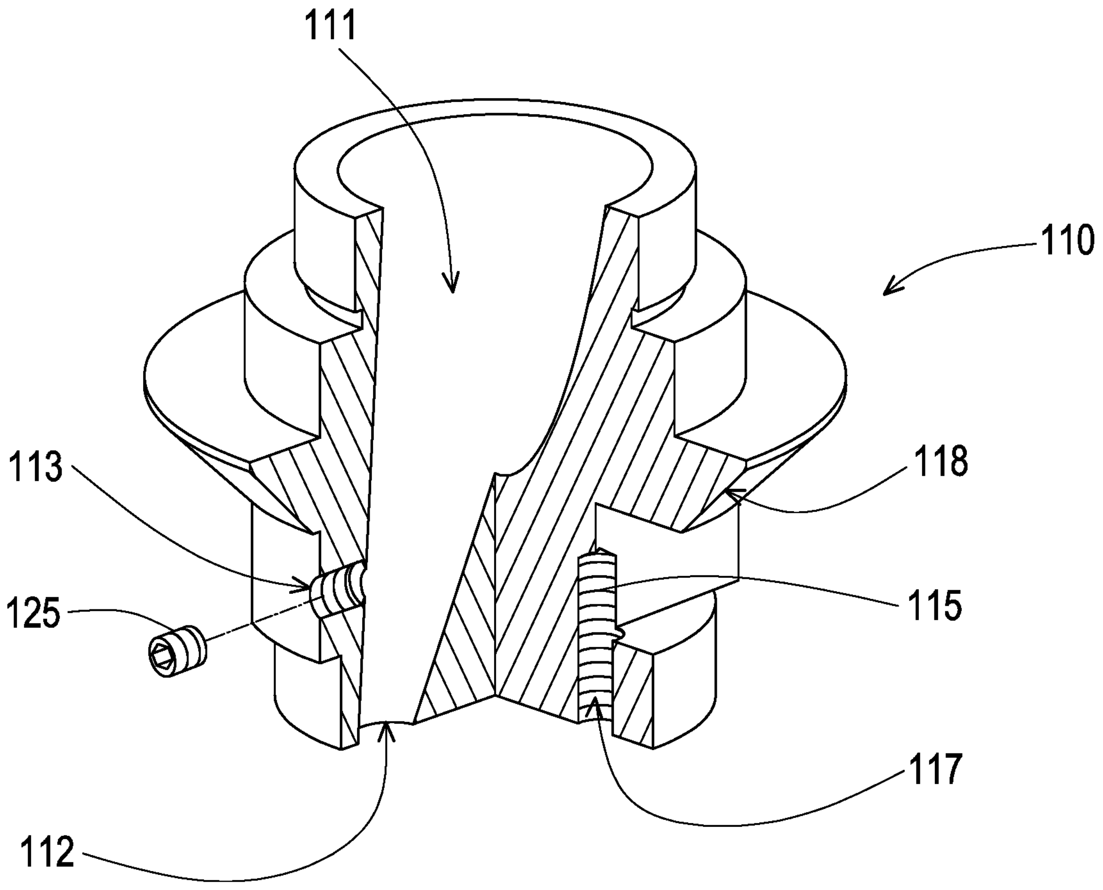
FIG. 2B is an enlarged schematic view of a rotating nozzle of FIG. 2A.

FIG. 2A is a cross-sectional exploded schematic view of the fluid introduction module for plasma system of FIG. 1. FIG. 2B is an enlarged schematic view of a rotating nozzle of FIG. 2A. Referring to FIG. 2A and FIG. 2B, the fluid introduction module for plasma system 100 of the embodiment includes a rotating nozzle 110. In detail, the rotating nozzle 110 includes a main flow channel 111 adapted to communicate with the plasma system 10 (FIG. 1), a plasma outlet 112 located at an end of the main flow channel 111, a mixing flow channel 113 that penetrates through a side wall of the rotating nozzle 110 and communicates with the main flow channel 111, an independent flow channel 115 separated from the main flow channel 111, and a precursor independent outlet 117 located at an end of the independent flow channel 115.

According to FIG. 2A and FIG. 2B, it can be seen that in this embodiment, the main flow channel 111 is cone-shaped, and the plasma outlet 112 is deviated from a center axis of the rotating nozzle 110. Such a design may facilitate formation of large-area coatings.

Figure 3:
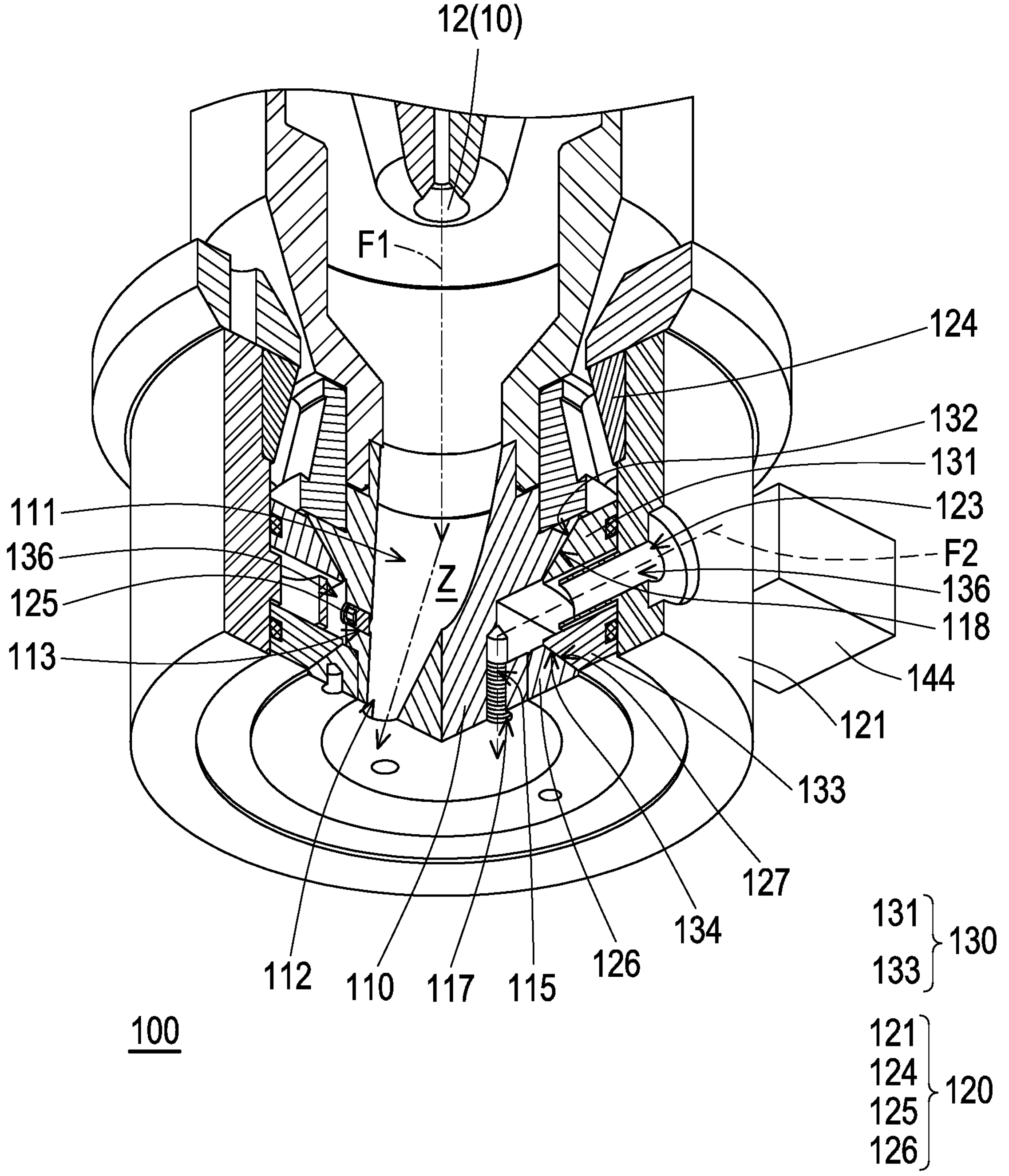
FIG. 3 is a cross-sectional schematic view of a blocking member arranged in a mixing flow channel in the fluid introduction module for plasma system of FIG. 2A.

Besides, the fluid introduction module for plasma system 100 further includes a rotating housing 140, and the rotating nozzle 110 is disposed under the rotating housing 140 and communicates with the rotating housing 140. FIG. 3 is a cross-sectional schematic view of a blocking member 125 arranged in the mixing flow channel 113 in the fluid introduction module for plasma system 100 of FIG. 2A.

Refer to FIG. 3, in this embodiment, the plasma system 10 includes an inner electrode 12 disposed in the rotating housing 140. The inner electrode 12 may communicate with a voltage source (not shown, an anode), and the rotating housing 140 and the rotating nozzle 110 may be grounded to become a cathode. A plasma generating zone Z is formed among the inner electrode 12, the rotating housing 140, and the rotating nozzle 110. In this embodiment, the main flow channel 111 is a portion of the plasma generating zone Z.

When the voltage source provides a voltage to the inner electrode 12, the inner electrode 12, the rotating nozzle 110, and air in the plasma generating zone Z interact with one another to generate plasma F1. The plasma F1 may pass through the main flow channel 111 and flows out of the rotating nozzle 110 from the plasma outlet 112.

Referring to FIG. 2A again, the fluid introduction module for plasma system 100 of this embodiment further includes a precursor supply device 120. The precursor supply device 120 may act as a pipeline for supplying a precursor fluid F2 (FIG. 3) into the rotating nozzle 110, such that the precursor fluid F2 may be mixed with the plasma F1 to form a special surface functional group or a coating film.

To be specific, the precursor supply device 120 includes a fixed housing 121 and a rotating bearing 124. The fixed housing 121 includes a precursor inlet 123, and the precursor fluid F2 may enter the fluid introduction module for plasma system 100 from the precursor inlet 123. In other embodiments, a plurality of precursor inlets 123 may be provided, and the number of the precursor inlets 123 is not limited thereto.

The fixed housing 121 is sleeved outside the rotating nozzle 110, and the rotating bearing 124 is disposed between the rotating nozzle 110 and the fixed housing 121. In this embodiment, the rotating bearing 124 is, for example, a roller bearing, and in other embodiments, the rotating bearing may also be a ball bearing. The type of the rotating bearing 124 is not limited thereto.

The fixed housing 121 of the precursor supply device 120 is sleeved outside the rotating nozzle 110 through the rotating bearing 124, so that the fixed housing 121 does not rotate along with rotation of the rotating nozzle 110. Therefore, the precursor fluid F2 may be introduced into the rotating nozzle 110 through a channel 136 on the fixed housing 121.

As shown in FIG. 2A, the channel 136 communicates with the precursor inlet 123, the mixing flow channel 113, and the independent flow channel 115. To be specific, in this embodiment, the fixed housing 121 includes two inner ribs 128 protruding from an inner surface, and the channel 136 is formed between the two inner ribs 128. It may be seen from FIG. 2A that the precursor fluid may flow from the precursor inlet 123 to the mixing flow channel 113 and the independent flow channel 115 through the channel 136.

It should be noted that in this embodiment, the precursor supply device 120 further includes a blocking member 125, so that the precursor inlet 123 may selectively communicate with either the mixing flow channel 113 or the independent flow channel 115. For example, in this embodiment, the blocking member 125 is, for example, a set screw. The blocking member 125 includes an external thread, the mixing flow channel 113 includes a first internal thread corresponding to the external thread, and the independent flow channel 115 includes a second internal thread corresponding to the external thread.

As shown in FIG. 3, the blocking member 125 may be adjustably disposed in the mixing flow channel 113 to block the communication between the precursor inlet 123 and the mixing flow channel 113. In this embodiment, the precursor inlet 123 does not communicate with the mixing flow channel 113, and the precursor inlet 123 only communicates with the independent flow channel 115.

Therefore, when the precursor inlet 123 only communicates with the independent flow channel 115, the precursor fluid F2 is suitable to flow from the precursor inlet 123 to the independent flow channel 115. Further, after flowing out from the precursor independent outlet 117, the precursor fluid F2 is mixed with the plasma F1 flowing out of the plasma outlet 112. That is, the plasma F1 and the precursor fluid F2 are mixed outside the rotating nozzle 110 after flowing out from the plasma outlet 112 and the independent precursor outlet 117, respectively.

Figure 4:
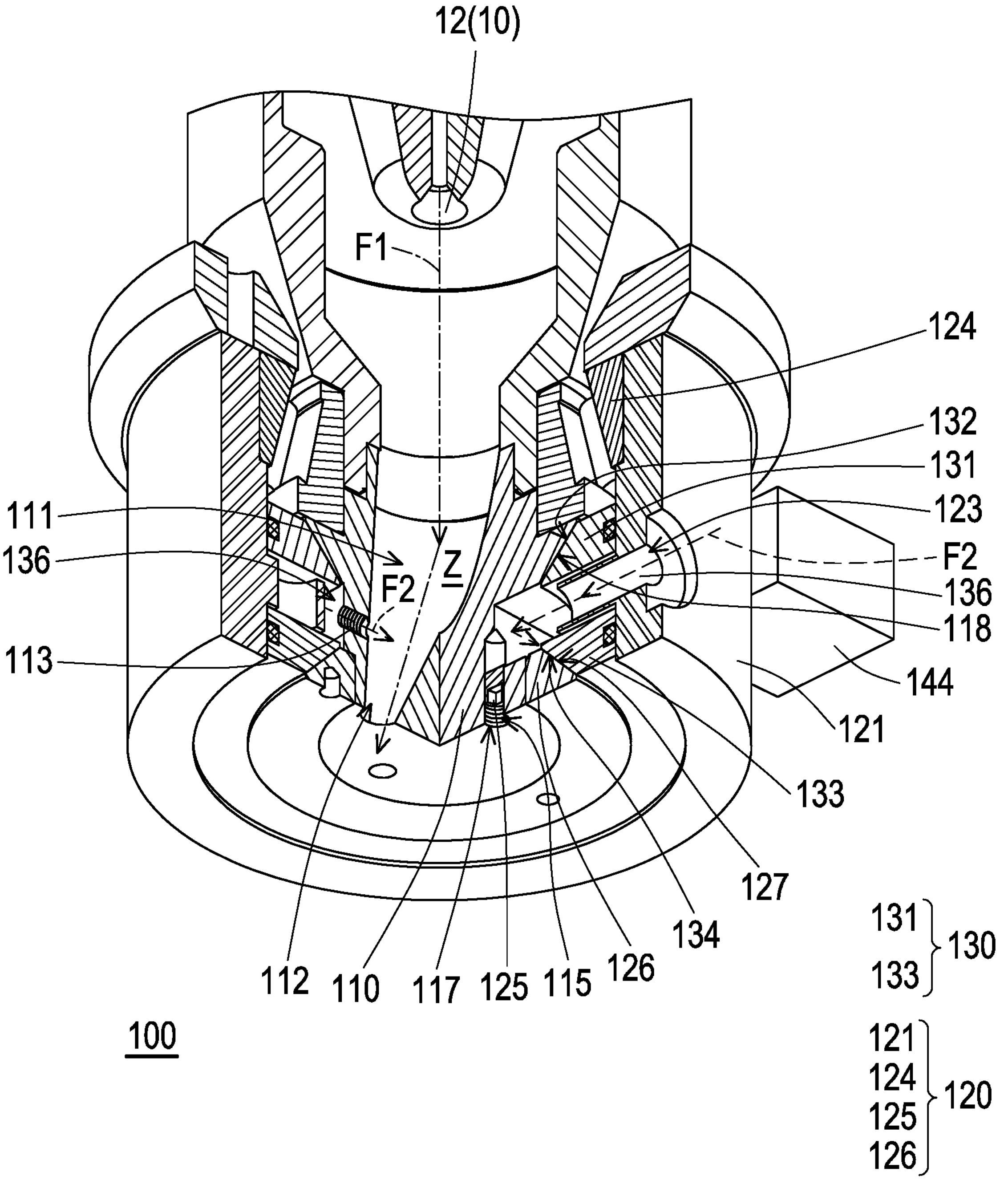
FIG. 4 is a cross-sectional schematic view of the blocking member arranged in an independent flow channel in the fluid introduction module for plasma system of FIG. 2A.

FIG. 4 is a cross-sectional schematic view of the blocking member 125 arranged in the independent flow channel 115 in the fluid introduction module for plasma system 100 of FIG. 2A. Referring to FIG. 4, in this embodiment, the blocking member 125 may be adjustably disposed in the independent flow channel 115 to block the communication between the precursor inlet 123 and the independent flow channel 115. In this embodiment, the precursor inlet 123 does not communicate with the independent flow channel 115, and the precursor inlet 123 only communicates with the mixing flow channel 113.

When the precursor inlet 123 is adjusted to only communicate with the mixing flow channel 113, the precursor fluid F2 is adapted to flow from the precursor inlet 123 to the main flow channel 111 (the plasma generating zone Z) through the mixing flow channel 113 to be mixed with the plasma F1 flowing into the main flow channel 111 and flows out from the plasma outlet 112 together with the plasma F1. In other words, the plasma F1 and the precursor fluid F2 flow out of the plasma outlet 112 after being mixed in the main flow channel 111 of the rotating nozzle 110.

It may be seen from the above that in the fluid introduction module for plasma system 100 provided by this embodiment, it may be determined whether the precursor inlet 123 communicates with the mixing flow channel 113 or the independent flow channel 115 through an arrangement position of the blocking member 125 to satisfy different mixing needs.

It should be noted that in other embodiments, the blocking member 125 may also be in a form of a plug and may be pluggably plugged in the mixing flow channel 113 or the independent flow channel 115. Certainly, the type of blocking member 125 is not limited thereto. Alternatively, in other embodiments, the channel 136 of the fixed housing 121 may also be provided with a switch or a valve to determine whether the precursor inlet 123 communicates with the mixing flow channel 113 or communicates with the independent flow channel 115. In addition, in an embodiment, arrangement of the blocking member 125 may be performed manually or automatically.

In an experiment, a 4-inch sapphire wafer is placed on a surface of a polishing rotating disk. A contact angle of the sapphire wafer measured at 10 points is 36.5±4 degrees before plasma treatment, and after plasma treatment with air (CDA), the contact angle of the sapphire wafer drops to 13 degrees to 15 degrees. Besides, the precursor fluid F2 containing water and the plasma F1 are introduced (as shown in FIG. 3, the precursor fluid F2 and the plasma F1 are introduced in a split manner), and the contact angle of the sapphire wafer drops to <10 degrees (approximately 6 degrees to 8 degrees). It is shown that the introduction of water acting as the precursor fluid F2 does help to improve effectiveness of treatment. Through the fluid introduction module for plasma system 100 provided by this embodiment, different options may also be provided for the mixing of the precursor fluid F2 and the plasma F1. In this experiment, a polishing rotation rate is 480 rpm, power of the plasma F1 is 350 watts, a working distance is 16 mm, and processing time is 5 seconds.

Referring to FIG. 2A, FIG. 2B, FIG. 3, and FIG. 4 again, in this embodiment, the fluid introduction module for plasma system 100 further includes a sealing set 130 fixed to the fixed housing 121 of the precursor supply device 120, and the sealing set 130 surrounds the rotating nozzle 110 and abuts against the rotating nozzle 110 closely. When the blocking member 125 is disposed in the independent flow channel 115 and that the mixing flow channel 113 communicates with the main flow channel 111, in some cases, the plasma F1 may flow to the mixing flow channel 113 as well as a gap between the fixed housing 121 (a fixed part) and the rotating nozzle 110 (a moving part) as being affected by an excessively pressure and thus deviates from an original flow direction. But through arrangement of the sealing set 130, this deviation from the plasma flow direction may be prevented from occurring.

To be specific, as shown in FIG. 2A, the sealing set 130 includes a first sealing ring 131 and a second sealing ring 133. The first sealing ring 131 and the second sealing ring 133 are placed on an upper side and a lower side of the two inner ribs 128 of the fixed housing 121. In addition, the fluid introduction module for plasma system 100 further includes a positioning member 126 fixed to an end (a lower end) of the rotating nozzle 110 and rotating together with the rotating nozzle 110.

In the embodiment, the first sealing ring 131 is sleeved outside the rotating nozzle 110. The first sealing ring 131 includes a first contact surface 132, and the first contact surface 132 contacts a first outer surface 118 of the rotating nozzle 110. The first contact surface 132 and the first outer surface 118 are, for example, two inclined surfaces with corresponding contours to increase an abutting area. In other embodiments, the first contact surface 132 and the first outer surface 118 may also be two stepped surfaces, for example.

The second sealing ring 133 is sleeved outside the positioning member 126. The second sealing ring 133 includes a second contact surface 134, and the second contact surface 134 contacts a second outer surface 127 of the positioning member 126. The second contact surface 134 and the second outer surface 127 are, for example, two inclined surfaces with corresponding contours to increase the abutting area. In other embodiments, the second contact surface 134 and the second outer surface 127 may also be two stepped surfaces, for example.

The two inner ribs 128 of the fixed housing 121 have at least one through hole 129. The sealing set 130 further includes at least one elastic member 135. The elastic member 135 passes through the through hole 129 and is located between the first sealing ring 131 and the second sealing ring 133 to push against the first sealing ring 131 and the second sealing ring 133. In this way, the first sealing ring 131 abuts against the rotating nozzle 110 and the fixed housing 121 closely, and the second sealing ring 133 abuts against the rotating nozzle 110 and the positioning member 126 closely.

In other words, the first sealing ring 131 is used to seal a gap between the rotating nozzle 110 (the moving part) and the fixed housing 121 (the fixed part). The second sealing ring 133 is used to seal a gap between the rotating nozzle 110 (the moving part) and the positioning member 126 (the fixed part) to prevent the plasma F1 or the precursor fluid F2 from overflowing into the gap between the rotating nozzle 110 (the moving part) and the fixed housing 121 (the fixed part) or overflowing into the gap between the rotating nozzle 110 (the moving part) and the positioning member 126 (the fixed part). In this embodiment, the first sealing ring 131 and the second sealing ring 133 are graphite friction sealing rings, but the materials of the first sealing ring 131 and the second sealing ring 133 are not limited thereto.

In addition, in this embodiment, since the fixed housing 121 is configured to be connected to an injection pipeline (not shown) of the precursor fluid F2, the fixed housing 121 cannot rotate along with the rotating nozzle 110. In order to avoid damage to the injection pipeline when the rotating bearing 124 does not function well and the fixed housing 121 thereby rotates along with the rotating nozzle 110, the fluid introduction module for plasma system 100 of the embodiment is further designed to include a safety switch 144.

Figure 5:
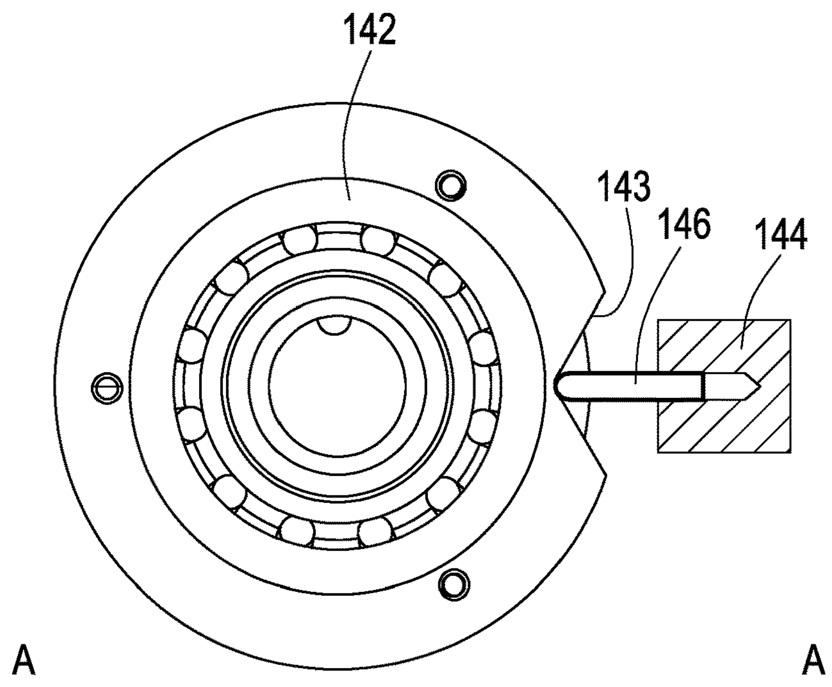
FIG. 5 is a cross-sectional schematic view taken along a section line A-A in FIG. 1.

To be specific, FIG. 5 is a cross-sectional schematic view taken along a section line A-A in FIG. 1. Referring to FIG. 5, in this embodiment, the fluid introduction module for plasma system 100 further includes the safety switch 144 and a bearing gland 142. The bearing gland 142 is fixed to the fixed housing 121 and includes an abutting portion 143. The abutting portion 143 abuts against the safety switch 144. The safety switch 144 may be fixed to the plasma system 10 (FIG. 1) or other locations. It may be seen from FIG. 5 that in this embodiment, the abutting portion 143 is a V-shaped groove, and the safety switch 144 abuts against a surface of the V-shaped groove, especially a bottom portion of the V-shaped groove.

Figure 6:
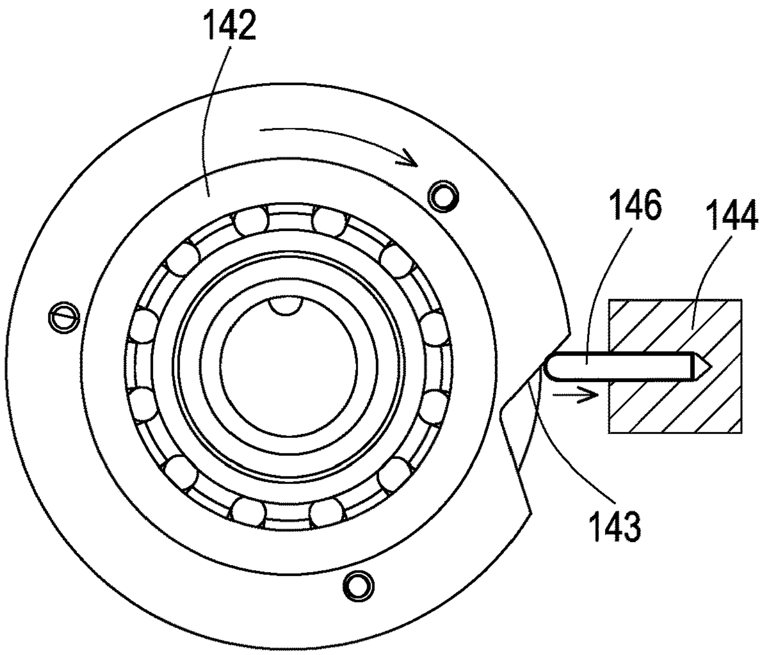
FIG. 6 is a schematic view of a push button of a safety switch being pushed when a bearing gland of FIG. 5 rotates.

FIG. 6 is a schematic view of a push button 146 of the safety switch 144 being pushed when the bearing gland 142 of FIG. 5 rotates. Referring to FIG. 6, when the rotating bearing does not function well, the fixed housing 121 rotates along with the rotating nozzle 110. Since the bearing gland 142 is fixed to the fixed housing 121, the bearing gland 142 also rotates, and the push button 146 of the safety switch 144 is retracted along a surface (inclined surface) of the abutting portion 143 of the bearing gland 142 to trigger the safety switch 144.

In this embodiment, the safety switch 144 is, for example, electrically connected to the rotating nozzle 110 through a controller (not shown). When the safety switch 144 is triggered, the controller instructs the rotating nozzle 110 to stop rotating, for example, to power off a motor that rotates the rotating nozzle 110 to achieve a protection effect.

The failure of the rotating bearing may be caused by high heat generated during the operation of the plasma system 10, which causes the rotating bearing to expand and then to become stuck. Therefore, in other embodiments, the fluid introduction module for plasma system 100 may also sense a temperature of the rotating bearing through a temperature sensor (not shown) and provides temperature feedback to the controller, so as to power off the motor rotating the rotating nozzle 110. Alternatively, when it is sensed that the temperature of the rotating bearing rises to a specific value, a cooling system (not shown) is used to cool down the fluid introduction module for plasma system 100 to prevent the rotating bearing from expanding and becoming stuck.

In view of the foregoing, in the fluid introduction module for plasma system provided by the disclosure, the main flow channel of the rotating nozzle of is adapted to communicate with the plasma system. The mixing flow channel of the rotating nozzle penetrates through the side wall of the rotating nozzle and communicates with the main flow channel, and the independent flow channel of the rotating nozzle is separated from the main flow channel. The fixed housing of the precursor supply device is sleeved outside the rotating nozzle through the rotating bearing, so that the fixed housing does not rotate along with the rotating nozzle. In addition, the precursor inlet of the fixed housing selectively communicates with either the mixing flow channel or the independent flow channel. Therefore, when the precursor inlet is adjusted to communicate with the mixing flow channel, the precursor fluid is adapted to flow from the precursor inlet to the main flow channel through the mixing flow channel, is mixed with the plasma flowing into the main flow channel, and flows out from the plasma outlet together with the plasma. Alternatively, when the precursor inlet is adjusted to communicate with the independent flow channel, the precursor fluid is adapted to flow from the precursor inlet to the independent flow channel, flows out from the precursor independent outlet, and then is mixed with the plasma flowing out from the plasma outlet. Therefore, through the fluid introduction module for plasma system provided by the disclosure, different mixing needs of the plasma and the precursor fluid may be satisfied.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A fluid introduction module for plasma system, adapted for being disposed in a plasma system, the fluid introduction module for plasma system comprising:

a rotating nozzle, comprising a main flow channel adapted to communicate with the plasma system, a plasma outlet located at an end of the main flow channel, a mixing flow channel that penetrates through a side wall of the rotating nozzle and communicates with the main flow channel, an independent flow channel separated from the main flow channel, and a precursor independent outlet located at an end of the independent flow channel; and a precursor supply device, comprising:

a fixed housing, sleeved outside the rotating nozzle, comprising a precursor inlet, wherein the precursor inlet selectively communicates with either the mixing flow channel or the independent flow channel; and a rotating bearing, disposed between the rotating nozzle and the fixed housing, wherein when the precursor inlet is adjusted to communicate with the mixing flow channel, a precursor fluid is adapted to flow from the precursor inlet to the main flow channel through the mixing flow channel, mix with a plasma flowing into the main flow channel, and flow out from the plasma outlet together with the plasma, and when the precursor inlet is adjusted to communicate with the independent flow channel, the precursor fluid is adapted to flow from the precursor inlet to the independent flow channel, and flow out from the precursor independent outlet, and then mix with the plasma flowing out from the plasma outlet.

2. The fluid introduction module for plasma system according to claim 1, further comprising a rotating housing, wherein the rotating nozzle is disposed below the rotating housing and communicates with the rotating housing, wherein the plasma system comprises an inner electrode disposed in the rotating housing, a plasma generating zone is formed among the inner electrode, the rotating housing, and the rotating nozzle, and the mixing flow channel is connected to the plasma generating zone.

3. The fluid introduction module for plasma system according to claim 1, wherein the precursor supply device further comprises a blocking member adjustably disposed on the mixing flow channel or the independent flow channel to block communication between the precursor inlet and the mixing flow channel or to block communication between the precursor inlet and the independent flow channel.

4. The fluid introduction module for plasma system according to claim 3, wherein the block member comprises an external thread, the mixing flow channel comprises a first internal thread, and the independent flow channel comprises a second internal thread.

5. The fluid introduction module for plasma system according to claim 1, further comprising a sealing set fixed on the fixed housing, wherein the sealing set surrounds the rotating nozzle and abuts against the rotating nozzle closely.

6. The fluid introduction module for plasma system according to claim 5, wherein the sealing set comprises a first sealing ring, a second sealing ring, and an elastic member, the fluid introduction module for plasma system further comprises a positioning member fixed to an end of the rotating nozzle, the first sealing ring is sleeved outside the rotating nozzle, the second sealing ring is sleeved outside the positioning member, and the elastic member is located between the first sealing ring and the second sealing ring, such that the first sealing ring and the second sealing ring respectively abut against the rotating nozzle and the positioning member.

7. The fluid introduction module for plasma system according to claim 6, wherein the first sealing ring comprises a first contact surface that contacts a first outer surface of the rotating nozzle, and the first contact surface and the first outer surface are two inclined surfaces or two stepped surfaces with corresponding contours.

8. The fluid introduction module for plasma system according to claim 6, wherein the second sealing ring comprises a second contact surface that contacts a second outer surface of the positioning member, and the second contact surface and the second outer surface are two inclined surfaces or two stepped surfaces with corresponding contours.

9. The fluid introduction module for plasma system according to claim 1, further comprising a safety switch and a bearing gland, wherein the safety switch is electrically connected to the rotating nozzle, the bearing gland is fixed to the fixed housing and comprises an abutting portion, the abutting portion abuts against the safety switch, and when the fixed housing rotates, the abutting portion pushes and triggers the safety switch, such that the rotating nozzle stops rotating.

10. The fluid introduction module for plasma system according to claim 9, wherein the abutting portion is a V-shaped groove, and the safety switch abuts on a surface of the V-shaped groove.

11. The fluid introduction module for plasma system according to claim 1, wherein the rotating bearing is a roller bearing or a ball bearing.

12. The fluid introduction module for plasma system according to claim 1, wherein the fixed housing comprises two inner ribs protruding from an inner surface, and a channel is formed between the two inner ribs.

13. The fluid introduction module for plasma system according to claim 12, wherein a switch or a valve is arranged on the channel such that the precursor inlet communicates with the mixing flow channel or communicates with the independent flow channel.

* * * * *